(No Model.)
M. JACOBS.
KEY GAGE.
No. 466,044.  Patented Dec. 29, 1891.
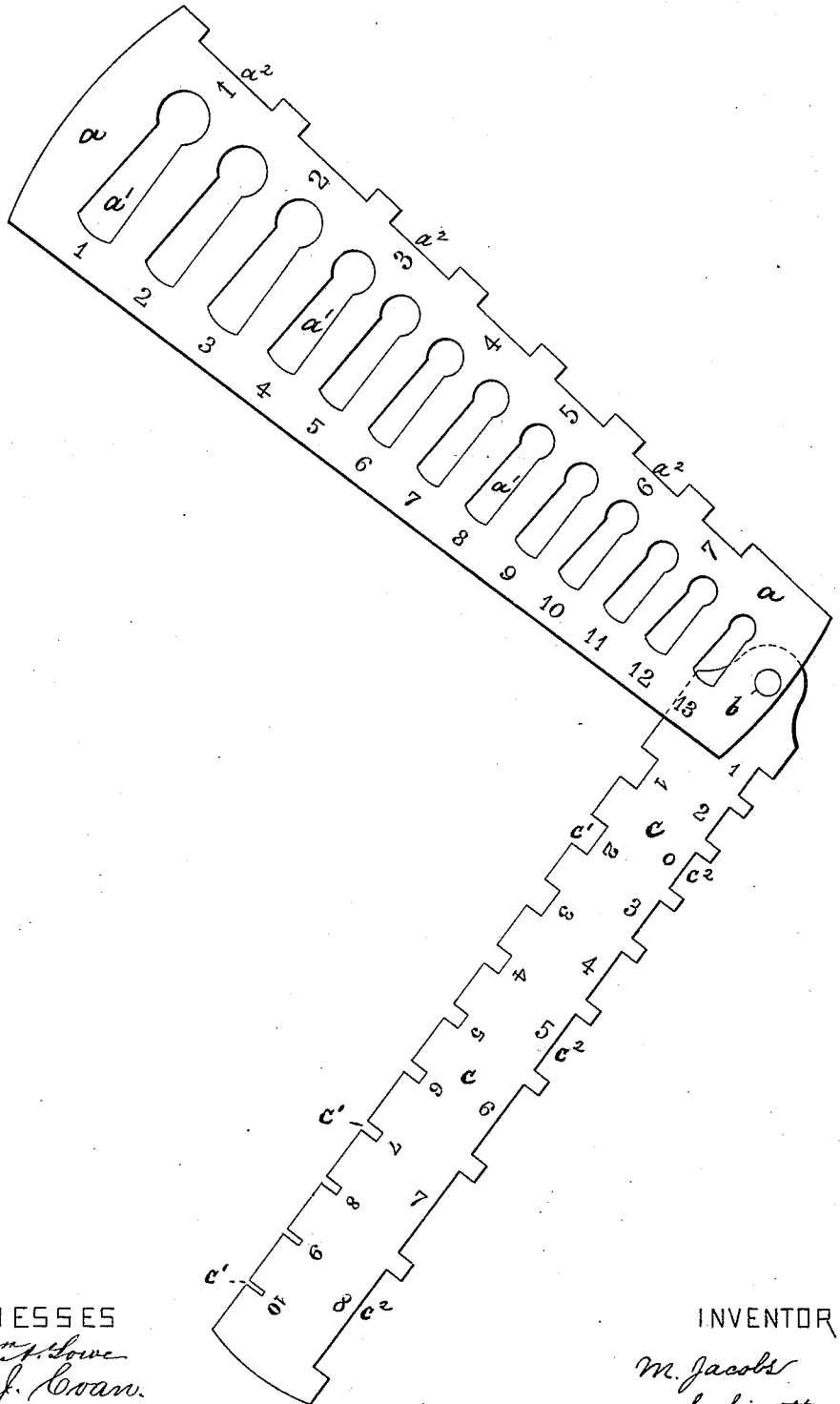
WITNESSES
INVENTOR

UNITED STATES PATENT OFFICE.

MAURICE JACOBS, OF NEW YORK, N. Y.

KEY-GAGE.

SPECIFICATION forming part of Letters Patent No. 466,044, dated December 29, 1891.

Application filed March 3, 1891. Serial No. 383,610. (No model.)

*To all whom it may concern:*

Be it known that I, MAURICE JACOBS, of New York city, New York, have invented an Improved Key-Gage, of which the following is a specification.

This invention relates to a gage for measuring the stem and bit of a key, and more particularly designed for fitting a key to a faucet-lock.

The invention consists in the various features of improvement more fully pointed out in the claims.

The accompanying drawing represents a face view of my improved key-gage.

The letter $a$ represents a plate, preferably of elongated form and provided with a series of openings $a'$ from end to end. These openings have curved upper ends and diverging shanks, so as to conform to the shape of the lower end of a bit-key. The openings increase in size from right to left to constitute a scale, which should be numbered, as shown. One of the edges of the plate $a$ is notched, as at $a^2$, and these notches likewise increase in size from right to left and are numbered. The openings $a'$ serve to measure the diameter of the barrel or stem of a key, while the notches $a^2$ serve to measure the length of the bit. The key is first fitted into one of the openings $a'$, so as to obtain the diameter of its barrel or stem, and then it is placed with its bit flat into one of the notches, so as to obtain the length of the bit. The combined measurements thus obtained permit the key to be fitted to the lock.

To the plate $a$ there is pivoted at one end, by pin $b$, one or more plates $c$. These plates are designed to gage the thickness and width of flat or sheet-metal keys. To this effect one of the edges of plate $c$ is provided with narrow gradually-increasing notches $c'$ to measure the thickness of the key, while the other edge is provided with wider gradually-increasing notches $c^2$ to measure the width of the key.

It will be seen that the plates $a$ $c$ combined may be utilized to measure keys of all the ordinary varieties.

What I claim is—

1. A key-gage consisting of a plate $a$, having a graduated notched edge $a^2$, and graduated openings $a'$, that are provided with curved ends and diverging shanks, substantially as specified.

2. A key-gage consisting of plate $a$, having graduated openings $a'$ and notched graduated edges $a^2$, and a pivoted plate $c$, having two notched graduated edges $c'$ $c^2$, substantially as specified.

MAURICE JACOBS.

Witnesses:
 F. V. BRIESEN,
 A. JONGHMANS.